No. 660,896. Patented Oct. 30, 1900.
G. G. FLOYD.
CAR TRUCK.
(Application filed Feb. 24, 1900.)
(No Model.) 2 Sheets—Sheet 1.
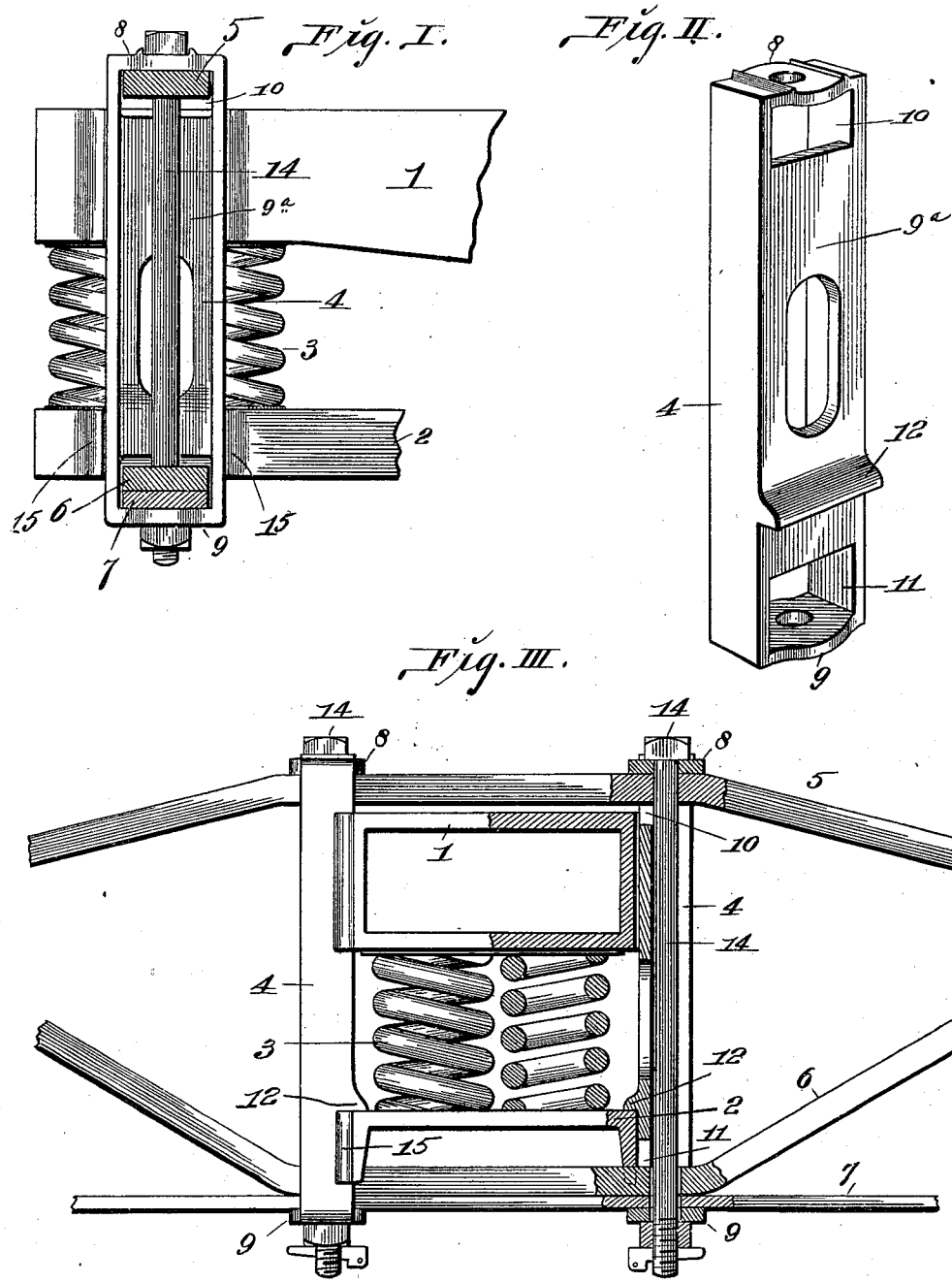
Inventor:
George G. Floyd:
By Wright Bros
Atty's.
Attest No. 660,896. Patented Oct. 30, 1900.
G. G. FLOYD.
CAR TRUCK.
(Application filed Feb. 24, 1900.)
(No Model.) 2 Sheets—Sheet 2.
Fig. IV.
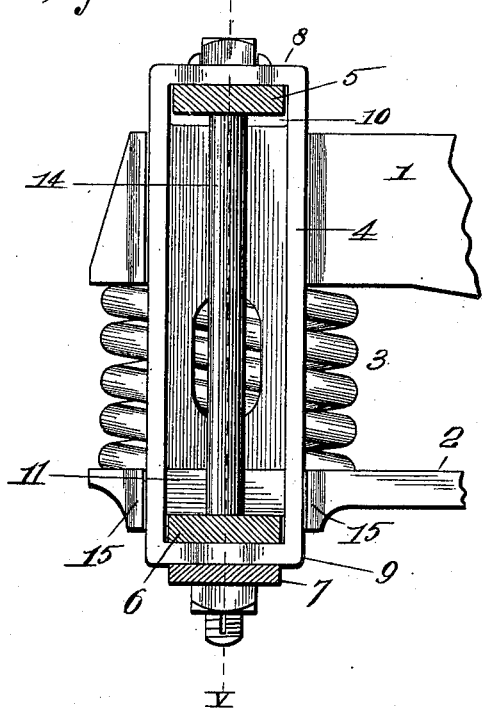
Fig. V.
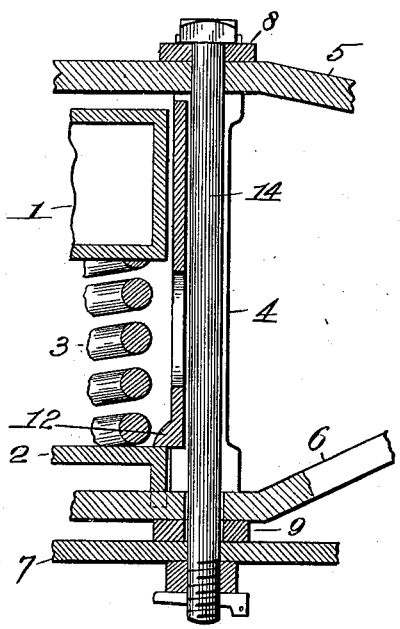
Fig. VI.
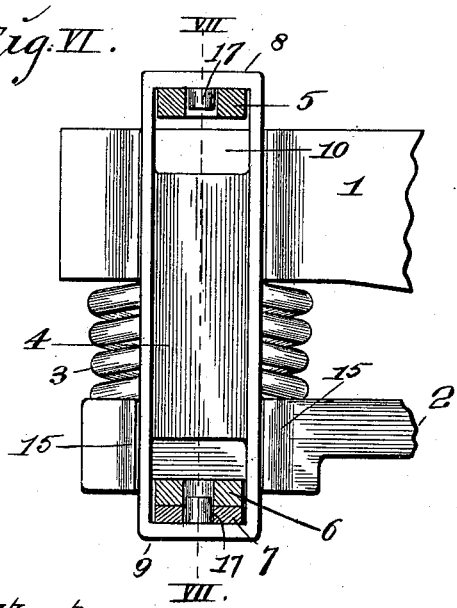
Fig. VII.
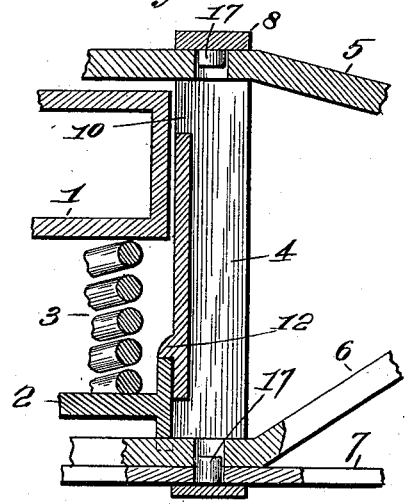
Attest:
N. F. Smith
E. S. Knight
Inventor:—
George G. Floyd.
By Knight Bros.
Att'ys.
THE NORRIS PETERS CO., PHOTO-LITHO., WASHINGTON, D. C.

UNITED STATES PATENT OFFICE.

GEORGE G. FLOYD, OF ST. LOUIS, MISSOURI, ASSIGNOR TO THE SHICKLE, HARRISON & HOWARD IRON COMPANY, OF SAME PLACE.

CAR-TRUCK.

SPECIFICATION forming part of Letters Patent No. 660,896, dated October 30, 1900.

Application filed February 24, 1900. Serial No. 6,329. (No model.)

*To all whom it may concern:*

Be it known that I, GEORGE G. FLOYD, a citizen of the United States, residing at the city of St. Louis, in the State of Missouri, have invented certain new and useful Improvements in Car-Trucks, of which the following is a full, clear, and exact description, reference being had to the accompanying drawings, forming part of this specification.

The object of my invention is to provide a column-guide for car-trucks which will relieve the strain on the column-bolts and which will serve as a means for strengthening the side frames of the truck by tying the upper and lower arch-bars together, so that in the use of the truck the arch-bars cannot move with relation to each other, especially at the point of support of the spring-plank and truck-bolster.

My invention consists in features of novelty hereinafter fully described, and pointed out in the claims.

Figure I illustrates my construction part in section and part in side view. Fig. II is a perspective view of one of the column-guides. Fig. III is a view part in elevation and part in vertical section. Fig. IV is a view part in side elevation and part in vertical section and illustrating a slight modification. Fig. V is a section taken on the line V V, Fig. IV. Fig. VI is a view corresponding to Fig. I, but illustrating another modification. Fig. VII is a section taken on the line VII VII, Fig. VI.

Referring to the drawings, 1 represents the truck-bolster; 2, the spring-plank; 3, the bolster-springs; 4, the column-guides; 5, the upper arch-bar of the truck-frame; 6, the lower arch-bar of the truck-frame; 7, the tie-bar, and 14 the column-bolts that hold the column-guides from movement on the upper and lower arch-bars.

The column-guides are constructed, as shown in Fig. II, with a top 8, a bottom 9, and a back 9ª. Beneath the top 8 is an opening 10 to receive the upper arch-bar, and over the bottom 9 is an opening 11 to receive the lower arch-bar and the tie-bar 7. Each column-guide is provided with a shoulder 12, that rests upon the spring-plank, thereby adding rigidity to the structure when the parts are connected up, and each column-guide is connected to the arch-bars and to the tie-bar by means of bolts 14, the bolts serving merely to keep the column-guides from moving horizontally on the arch-bars. It will thus be observed that the column-guides tie the upper and lower arch-bars together, thus relieving the bolts 14 from strain and preventing any spreading or movement of one of the bars with relation to the other, so that at the point of support between the side frames and the spring-plank the bolster and arch-bars, constituting the side frames of the truck, are held from movement with relation to each other, the result being a rigid and durable construction. The spring-plank is formed with vertical shoulders or ribs 15, between which the column-guides fit and which keep the parts from moving with relation to each other without the use of bolts or rivets.

In Figs. IV and V, I have shown the tie-bar 7 arranged beneath and outside of the lower ends of the column-guides.

In Figs. VI and VII, in lieu of the bolts 14, I have shown the column-guides provided with integral projections 17, that enter holes in the arch-bars and in the tie-bars.

I claim as my invention—

1. In a car-truck, the combination of a spring-plank, a truck-bolster, a side frame having upper and lower arch-bars, and a column-guide formed to embrace and entirely surround the arch-bars, substantially as set forth.

2. In a car-truck, a column-guide formed to embrace the upper and lower arch-bars and having openings through which the arch-bars pass, substantially as set forth.

3. A car-truck having side frames formed of upper and lower arch-bars, a column-guide formed with a top beneath which is an opening to receive the upper arch-bar and formed with a bottom above which is an opening to receive the lower arch-bar, substantially as set forth.

4. In a car-truck, the combination of a spring-plank, a bolster, side frames formed of arch-bars, and column-guides embracing the arch-bars and provided with integral shoulders adapted to bear on the spring-plank, substantially as described.

5. In a car-truck, the combination of a spring-plank having ribs, a bolster, side frames formed of arch-bars, and column-guides embracing the arch-bars and fitting between the ribs on the spring-plank, substantially as set forth.

6. In a car-truck, the combination of a spring-plank, a bolster, side frames formed of arch-bars, column-guides embracing and entirely surrounding the arch-bars, and bolts for holding the column-guides from horizontal movement on the arch-bars, substantially as set forth.

7. In a car-truck, the combination of the spring-plank having vertical ribs, a bolster, side frames formed of arch-bars, column-guides embracing the arch-bars and having shoulders adapted to bear on the spring-plank, and bolts for holding the column-guides from horizontal movement on the arch-bars; said column-guides fitting between the ribs on the spring-plank, substantially as described.

GEORGE G. FLOYD.

In presence of—
E. S. KNIGHT,
N. V. ALEXANDER.